(12) United States Patent
Wu et al.

(10) Patent No.: US 10,713,130 B2
(45) Date of Patent: Jul. 14, 2020

(54) REDUNDANCY METHOD, DEVICE, AND SYSTEM

(71) Applicant: Huawei Technologies Co., Ltd., Shenzhen (CN)

(72) Inventors: Xiangyang Wu, Xi'an (CN); Zhi Zhao, Xi'an (CN); Rong Chen, Issy les Moulineaux (FR); Xuan Jiang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 15/938,609

(22) Filed: Mar. 28, 2018

(65) Prior Publication Data

US 2018/0217903 A1 Aug. 2, 2018

Related U.S. Application Data

(63) Continuation of application No. PCT/CN2016/087702, filed on Jun. 29, 2016.

(30) Foreign Application Priority Data

Sep. 29, 2015 (CN) .......................... 2015 1 0634198

(51) Int. Cl.
*G06F 11/00* (2006.01)
*G06F 11/20* (2006.01)
(Continued)

(52) U.S. Cl.
CPC ...... *G06F 11/2025* (2013.01); *G06F 9/45558* (2013.01); *G06F 11/1464* (2013.01);
(Continued)

(58) Field of Classification Search
CPC ............. G06F 11/2025; G06F 11/1402; G06F 11/1446; G06F 11/1448; G06F 11/1461;
(Continued)

(56) References Cited

U.S. PATENT DOCUMENTS

2006/0129562 A1* 6/2006 Pulamarasetti ..... G06F 16/2308
2008/0168246 A1* 7/2008 Haustein ............. G06F 11/2071
711/162
(Continued)

FOREIGN PATENT DOCUMENTS

CN 102629224 A 8/2012
CN 103218260 A 7/2013
(Continued)

OTHER PUBLICATIONS

Salapura, V., et al., "Remote Restart for a High Performance Virtual Machine Recovery in a Cloud," XP033207445, 2015 IEEE 8th International Conference on Cloud Computing, Jun. 27, 2015, pp. 333-340.

(Continued)

*Primary Examiner* — Joseph D Manoskey
(74) *Attorney, Agent, or Firm* — Conley Rose, P.C.

(57) ABSTRACT

A redundancy method includes that a first disaster management function (DMF) device on a first site side receives a first request including identification information of a first virtual machine (VM) and a recovery point objective (RPO), allocates a maximum allowable delay time to each node that input/output (IO) data of the first VM passes through in a redundancy process, and sends a second request to a second DMF device on a second site side. The second request includes a maximum allowable delay time of a second replication gateway function (RGF) device on the second site side, and a maximum allowable delay time of an IO writer function (IOWF) device on the second site side and requests the second site side to perform redundancy on the first VM. Hence, the RPO requirements of the tenants can be satisfied in an entire redundancy process.

20 Claims, 7 Drawing Sheets

S11
A first DMF device on a first site side receives a first request sent by a CBF device, where the first request is used to request to perform redundancy on a first VM on the first site side, and the first request includes identification information of the first VM and an RPO S12
The first DMF device allocates, according to the RPO, a maximum allowable delay time to each node that IO data of the first VM passes through in a redundancy process, and sends a second request to a second DMF device on a second site side, where the second request is used to request the second site side to perform redundancy on the first VM, and the second request includes the identification information of the first VM, a maximum allowable delay time of a second RGF device on the second site side, and a maximum allowable delay time of an IOWF device on the second site side

(51) Int. Cl.
   *H04L 12/26* (2006.01)
   *H04L 12/24* (2006.01)
   *G06F 11/14* (2006.01)
   *G06F 9/455* (2018.01)
   *H04L 29/08* (2006.01)

(52) U.S. Cl.
   CPC ...... *H04L 41/0663* (2013.01); *H04L 41/0668* (2013.01); *H04L 43/0852* (2013.01); *H04L 67/10* (2013.01); *G06F 2009/45579* (2013.01); *G06F 2009/45595* (2013.01); *G06F 2201/815* (2013.01); *G06F 2201/82* (2013.01)

(58) Field of Classification Search
   CPC .............. G06F 11/1466; G06F 11/1469; G06F 11/2053; G06F 11/1464; G06F 9/45558; G06F 2209/45579; G06F 2209/45595; G06F 2201/815; G06F 2201/82; H04L 41/0663; H04L 41/0668; H04L 67/10; H04L 43/0852
   See application file for complete search history.

(56) References Cited

U.S. PATENT DOCUMENTS

| | | |
|---|---|---|
| 2011/0246627 A1 | 10/2011 | Kern |
| 2013/0080841 A1* | 3/2013 | Reddy ................ H04L 43/0876 714/47.3 |
| 2015/0112944 A1 | 4/2015 | Wu et al. |
| 2016/0203060 A1* | 7/2016 | Singh .................. G06F 11/1469 714/19 |
| 2016/0364300 A1* | 12/2016 | Kulkarni ............. G06F 11/1461 |
| 2017/0034318 A1 | 2/2017 | Gong et al. |
| 2017/0060900 A1* | 3/2017 | Marinov ............... G06F 16/178 |

FOREIGN PATENT DOCUMENTS

| | | |
|---|---|---|
| CN | 104115447 A | 10/2014 |
| CN | 105187256 A | 12/2015 |

OTHER PUBLICATIONS

Nayak, T., et al., "End-to-end Disaster Recovery Planning: From Art to Science," XP031692008, Network Operations and Management Symposium (NOMS), Apr. 19, 2010, pp. 357-364.
Foreign Communication From a Counterpart Application, European Application No. 16850160.9, Extended European Search Report dated May 28, 2018, 13 pages.
Machine Translation and Abstract of Chinese Publication No. CN102629224, Aug. 8, 2012, 12 pages.
Machine Translation and Abstract of Chinese Publication No. CN103218260, Jul. 24, 2013, 24 pages.
Machine Translation and Abstract of Chinese Publication No. CN105187256, Dec. 23, 2015, 47 pages.
Foreign Communication From a Counterpart Application, International Application No. PCT/CN2016/087702, English Translation of International Search Report dated Sep. 21, 2016, 2 pages.

* cited by examiner

REDUNDANCY METHOD, DEVICE, AND SYSTEM

CROSS-REFERENCE TO RELATED APPLICATIONS

This application is a continuation of International Patent Application No. PCT/CN2016/087702 filed on Jun. 29, 2016, which claims priority to Chinese Patent Application No. 201510634198.3 filed on Sep. 29, 2015. The disclosures of the aforementioned applications are hereby incorporated by reference in their entireties.

TECHNICAL FIELD

The present disclosure relates to the field of communications technologies, and in particular, to a redundancy method, a device, and a system that are based on a cloud business function (CBF).

BACKGROUND

A redundancy technology refers to a reliability mechanism in which two or more systems having similar functions are built at places relatively far from each other, and when disaster events such as earthquakes or fires happen, or when power off or other severe faults occur on a working system, the working system is switched to a remote redundancy system to maintain a capability of providing an application service.

Currently, a redundancy process for a virtual machine (VM) on a first site side is as follows. A system administrator configures, on a disaster management function (DMF) on the first site side according to a service requirement, a VM or some VMs that are on the first site side and that require redundancy. The DMF on the first site side requests a local virtualization management function (VMF) to intercept input/output (IO) of a specified VM. The VMF on the first site side requests to run an IO catcher function (IOCF) for the specified VM to intercept the IO of the specified VM, and sends intercepted data to a local replication gateway function (RGF). The DMF on the first site side requests the RGF to send the received data to an RGF of a redundancy site.

The DMF on the first site side sends a generated redundancy request to a DMF of the redundancy site to request the DMF of the redundancy site to complete a redundancy configuration. The DMF of the redundancy site requests a local VMF to create a placeholder VM, and obtains an identifier of the placeholder VM. The placeholder VM is not running. The DMF of the redundancy site requests the local RGF to send received data of a peer VM (that is, the VM that requires redundancy on the first site side) to a specified local IO writer function (IOWF). The IOWF writes the data to a local VM (that is, the placeholder VM) for storage.

When a condition (for example, a case in which both an external circuit and an optical cable in an equipment room break during an earthquake) for a redundancy switchover is met on the first site side, the system administrator starts the redundancy switchover on the DMF of the redundancy site. A specific switchover process is as follows. The DMF of the redundancy site requests the local RGF to stop receiving peer data, the DMF of the redundancy site requests the local VMF to stop the IOWF device from writing data to the local VM, and the DMF of the redundancy site requests the local VMF to start the local VM.

It can be learned from the foregoing process that a redundancy process for a VM is controlled by a system administrator. That is, a DMF on a first site side queries a VMF for all VMs managed by the VMF and presents the VMs to the administrator. The administrator specifies a VM that requires redundancy. The DMF notifies the VM specified by the administrator to a local IOCF and a peer DMF such that the peer DMF performs redundancy on the specified VM. However, in public cloud business, tenants serve themselves. That is, the tenants can start or shut down a cloud service by themselves, without intervention of the administrator. As a result, the existing redundancy process cannot support a tenant self-service in the public cloud business.

SUMMARY

Embodiments of the present disclosure provide a redundancy method, a device, and a system in order to resolve a problem that a tenant self-service cannot be supported in public cloud business.

According to a first aspect, a redundancy method is provided. The method includes receiving, by a first DMF device on a first site side, a first request sent by a CBF device, where the first request is used to request to perform redundancy on a first VM on the first site side, and the first request includes identification information of the first VM and a recovery point objective (RPO), and allocating, by the first DMF device according to the RPO, a maximum allowable delay time to each node that IO data of the first VM passes through in a redundancy process, and sending a second request to a second DMF device on a second site side, where the second request is used to request the second site side to perform redundancy on the first VM, and the second request includes the identification information of the first VM, a maximum allowable delay time of a second RGF device on the second site side, and a maximum allowable delay time of an IOWF device on the second site side.

With reference to the first aspect, in a first possible implementation, allocating, by the first DMF device, a maximum allowable delay time to each node according to the RPO includes determining, by the first DMF device, a maximum allowable transmission delay per unit bandwidth on a link for transmitting the IO data of the first VM, determining, by the first DMF device, a difference between the RPO and the maximum allowable transmission delay per unit bandwidth on the link for transmitting the IO data of the first VM, setting, by the first DMF device, partial duration of the difference as a reserved delay, and allocating the maximum allowable delay time to each node based on remaining duration of the difference, where a sum of the maximum allowable delay times (MADT) of the nodes is the remaining duration of the difference.

With reference to the first possible implementation of the first aspect, in a second possible implementation, a maximum allowable delay time allocated by the first DMF device to a node, that is configured to remotely transmit IO data, of the nodes is greater than a maximum allowable delay time allocated by the first DMF device to a node, that is configured to locally transmit IO data, of the nodes, and the maximum allowable delay time allocated by the first DMF device to the node, that is configured to locally transmit IO data, of the nodes is greater than a maximum allowable delay time allocated by the first DMF device to a node, that is configured to cache IO data, of the nodes.

With reference to the first aspect, in a third possible implementation, the method further includes sending, by the first DMF device, a third request to a first VMF device on the first site side, where the third request is used to request the first VMF device to configure an IOCF device on the first site side such that the IOCF device sends intercepted IO data to a first RGF device on the first site side according to a maximum allowable delay time allocated by the first DMF device to the IOCF device.

With reference to the third possible implementation of the first aspect, in a fourth possible implementation, the method further includes instructing, by the first DMF device after receiving a timeout request sent by the IOCF device, the IOCF device to discard the IO data that needs to be transmitted currently, or reallocating, by the first DMF device, a maximum allowable delay time to the IOCF after receiving a timeout request sent by the IOCF device, and sending the reallocated maximum allowable delay time to the IOCF device.

With reference to the first aspect, in a fifth possible implementation, the method further includes sending, by the first DMF device, a fourth request to a first RGF device on the first site side, where the fourth request is used to request the first RGF device to receive IO data of the first VM intercepted by an IOCF device and send the received IO data to the second RGF device on the second site side according to a maximum allowable delay time allocated by the first DMF device to the first RGF device.

With reference to the fifth possible implementation of the first aspect, in a sixth possible implementation, the fourth request carries connection information of the second RGF device on the second site side, or the method further includes sending, by the first DMF device, connection information of the second RGF device to the first RGF device after receiving a fifth request sent by the first RGF device.

With reference to the fifth possible implementation of the first aspect, in a seventh possible implementation, the method further includes instructing, by the first DMF device after receiving a timeout request sent by the first RGF device, the first RGF device to discard the IO data that needs to be transmitted currently, or reallocating, by the first DMF device, a maximum allowable delay time to the first RGF device after receiving a timeout request sent by the first RGF device, and sending the reallocated maximum allowable delay time to the first RGF device.

With reference to the first aspect, in an eighth possible implementation, the method further includes reallocating, by the first DMF device after receiving a timeout request sent by the second DMF device on the second site side, a maximum allowable delay time to the second RGF device on the second site side and/or the IOWF device on the second site side according to the timeout request, and sending the reallocated maximum allowable delay time to the second DMF device.

With reference to any one of the first aspect or the first to the eighth possible implementations of the first aspect, in a ninth possible implementation, after determining that a transmission rate on the link for transmitting the IO data of the first VM changes, the method further includes reallocating, by the first DMF device, a maximum allowable delay time to each node that the IO data of the first VM passes through in the redundancy process, and notifying the nodes.

According to a second aspect, a redundancy method is provided. The method includes receiving, by a CBF device, a sixth request sent by a tenant, where the sixth request includes identification information of a first VM that is on a first site side and that requires redundancy, and a service level agreement (SLA) required when redundancy is performed on the first VM, determining, by the CBF device, an RPO from the sixth request, and sending a first request to the first site side, where the first request is used to request to perform redundancy on the first VM on the first site side, and the first request includes the identification information of the first VM and the RPO.

According to a third aspect, a redundancy method is provided. The method includes receiving, by a second DMF device on a second site side, a second request sent by a first DMF device on a first site side, where the second request is used to request the second site side to perform redundancy on a first VM on the first site side, sending, by the second DMF device, a seventh request to a second VMF device on the second site side, where the seventh request is used to request the second VMF device to configure an IOWF device on the second site side such that the IOWF device writes, according to a maximum allowable delay time allocated by the first DMF device to the IOWF device, IO data of the first VM into a second VM that is configured to perform redundancy on the first VM, and sending, by the second DMF device, an eighth request to a second RGF device on the second site side, where the eighth request is used to request the second RGF device to locally transmit the IO data of the first VM according to a maximum allowable delay time allocated by the first DMF device to the second RGF device.

With reference to the second aspect, in a first possible implementation, the method includes instructing, by the second DMF device after receiving a timeout request sent by the IOWF device, the IOWF device to discard the IO data that needs to be transmitted currently, or sending, by the second DMF device after receiving a timeout request sent by the IOWF device, the timeout request to the first DMF device to request the first DMF device to reallocate a maximum allowable delay time to the IOWF device, and sending the reallocated maximum allowable delay time, returned by the first DMF device to the IOWF device after receiving the reallocated maximum allowable delay time.

With reference to the second aspect, in a second possible implementation, the method includes instructing, by the second DMF device after receiving a timeout request sent by the second RGF device, the second RGF device to discard the IO data that needs to be transmitted currently, or sending, by the second DMF device after receiving a timeout request sent by the second RGF device, the timeout request to the first DMF device to request the first DMF device to reallocate a maximum allowable delay time to the second RGF device, and sending the reallocated maximum allowable delay time, returned by the first DMF device to the second RGF device after receiving the reallocated maximum allowable delay time.

According to a fourth aspect, a DMF device is provided. The device includes a receiving module configured to receive a first request sent by a CBF device, where the first request is used to request to perform redundancy on a first VM on a first site side, and the first request includes identification information of the first VM and an RPO, a processing module configured to allocate, according to the RPO, a maximum allowable delay time to each node that IO data of the first VM passes through in a redundancy process, and a sending module configured to send, under control of the processing module, a second request to a second DMF device on a second site side, where the second request is used to request the second site side to perform redundancy on the first VM, and the second request includes the identification information of the first VM, a maximum allowable delay time of a second RGF device on the second site side, and a maximum allowable delay time of an IOWF device on the second site side.

With reference to the fourth aspect, in a first possible implementation, the processing module is further configured to determine a maximum allowable transmission delay per unit bandwidth on a link for transmitting the IO data of the first VM, determine a difference between the RPO and the maximum allowable transmission delay per unit bandwidth on the link for transmitting the IO data of the first VM, set partial duration of the difference as a reserved delay, and allocate the maximum allowable delay time to each node based on remaining duration of the difference, where a sum of the MADT of the nodes is the remaining duration of the difference.

With reference to the first possible implementation of the fourth aspect, in a second possible implementation, a maximum allowable delay time allocated by the processing module to a node, that is configured to remotely transmit IO data, of the nodes is greater than a maximum allowable delay time allocated by the processing module to a node, that is configured to locally transmit IO data, of the nodes, and the maximum allowable delay time allocated by the processing module to the node, that is configured to locally transmit IO data, of the nodes is greater than a maximum allowable delay time allocated by the processing module to a node, that is configured to cache IO data, of the nodes.

With reference to the fourth aspect, in a third possible implementation, the sending module is further configured to send, under control of the processing module, a third request to a first VMF device on the first site side, where the third request is used to request the first VMF device to configure an IOCF device on the first site side such that the IOCF device sends intercepted IO data to a first RGF device on the first site side according to a maximum allowable delay time allocated by the processing module to the IOCF device.

With reference to the third possible implementation of the fourth aspect, in a fourth possible implementation, the processing module is further configured to instruct, after the receiving module receives a timeout request sent by the IOCF device, the IOCF device to discard the IO data that needs to be transmitted currently, or reallocate a maximum allowable delay time to the IOCF after the receiving module receives a timeout request sent by the IOCF device, and send the reallocated maximum allowable delay time to the IOCF device.

With reference to the fourth aspect, in a fifth possible implementation, the sending module is further configured to send, under control of the processing module, a fourth request to a first RGF device on the first site side, where the fourth request is used to request the first RGF device to receive IO data of the first VM intercepted by an IOCF device and send the received IO data to the second RGF device on the second site side according to a maximum allowable delay time allocated by the processing module to the first RGF device.

With reference to the fifth possible implementation of the fourth aspect, in a sixth possible implementation, the fourth request carries connection information of the second RGF device on the second site side, or the processing module is further configured to control the sending module to send connection information of the second RGF device to the first RGF device after the receiving module receives a fifth request sent by the first RGF device.

With reference to the fifth possible implementation of the fourth aspect, in a seventh possible implementation, the processing module is further configured to instruct, after the receiving module receives a timeout request sent by the first RGF device, the first RGF device to discard the IO data that needs to be transmitted currently, or reallocate a maximum allowable delay time to the first RGF device after the receiving module receives a timeout request sent by the first RGF device, and control the sending module to send the reallocated maximum allowable delay time to the first RGF device.

With reference to the fourth aspect, in an eighth possible implementation, the processing module is further configured to reallocate, after the receiving module receives a timeout request sent by the second DMF device on the second site side, a maximum allowable delay time to the second RGF device on the second site side and/or the IOWF device on the second site side according to the timeout request, and control the sending module to send the reallocated maximum allowable delay time to the second DMF device.

With reference to any one of the fourth aspect or the first to the eighth possible implementations of the fourth aspect, in a ninth possible implementation, after determining that a transmission rate on the link for transmitting the IO data of the first VM changes, the processing module is further configured to reallocate a maximum allowable delay time to each node that the IO data of the first VM passes through in the redundancy process, and control the sending module to notify each node.

According to a fifth aspect, a CBF device is provided. The device includes a receiving module configured to receive a sixth request sent by a tenant, where the sixth request includes identification information of a first VM that is on a first site side and that requires redundancy, and an SLA required when redundancy is performed on the first VM, a processing module configured to determine an RPO from the sixth request, and a sending module configured to send a first request to the first site side under control of the processing module, where the first request is used to request to perform redundancy on the first VM on the first site side, and the first request includes the identification information of the first VM and the RPO.

According to a sixth aspect, a DMF device is provided. The device includes a receiving module configured to receive a second request sent by a first DMF device on a first site side, where the second request is used to request a second site side to perform redundancy on a first VM on the first site side, and a sending module configured to send, under control of a processing module, a seventh request to a second VMF device on the second site side, where the seventh request is used to request the second VMF device to configure an IOWF device on the second site side such that the IOWF device writes, according to a maximum allowable delay time allocated by the first DMF device to the IOWF device, IO data of the first VM into a second VM that is configured to perform redundancy on the first VM, and send, under control of the processing module, an eighth request to a second RGF device on the second site side, where the eighth request is used to request the second RGF device to locally transmit the IO data of the first VM according to a maximum allowable delay time allocated by the first DMF device to the second RGF device.

With reference to the sixth aspect, in a first possible implementation, the processing module is further configured to instruct, after the receiving module receives a timeout request sent by the IOWF device, the IOWF device to discard the IO data that needs to be transmitted currently, or control the sending module to send, after the receiving module receives a timeout request sent by the IOWF device, the timeout request to the first DMF device to request the first DMF device to reallocate a maximum allowable delay time to the IOWF device, and send the reallocated maximum allowable delay time, returned by the first DMF device, to the IOWF device after the reallocated maximum allowable delay time is received.

With reference to the sixth aspect, in a second possible implementation, the processing module is further configured to instruct, after the receiving module receives a timeout request sent by the second RGF device, the second RGF device to discard the IO data that needs to be transmitted currently, or control the sending module to send, after the receiving module receives a timeout request sent by the second RGF device, the timeout request to the first DMF device to request the first DMF device to reallocate a maximum allowable delay time to the second RGF device, and control the sending module to send the reallocated maximum allowable delay time, returned by the first DMF device, to the second RGF device after the receiving module receives the reallocated maximum allowable delay time.

According to a seventh aspect, a DMF device is provided. The device includes a receiver configured to receive a first request sent by a CBF device, where the first request is used to request to perform redundancy on a first VM on a first site side, and the first request includes identification information of the first VM and an RPO, a processor configured to allocate, according to the RPO, a maximum allowable delay time to each node that IO data of the first VM passes through in a redundancy process, and a transmitter configured to send, under control of the processor, a second request to a second DMF device on a second site side, where the second request is used to request the second site side to perform redundancy on the first VM, and the second request includes the identification information of the first VM, a maximum allowable delay time of a second RGF device on the second site side, and a maximum allowable delay time of an IOWF device on the second site side.

With reference to the seventh aspect, in a first possible implementation, the processor is further configured to determine a maximum allowable transmission delay per unit bandwidth on a link for transmitting the IO data of the first VM, determine a difference between the RPO and the maximum allowable transmission delay per unit bandwidth on the link for transmitting the IO data of the first VM, set partial duration of the difference as a reserved delay, and allocate the maximum allowable delay time to each node based on remaining duration of the difference, where a sum of the MADT of the nodes is the remaining duration of the difference.

With reference to the first possible implementation of the seventh aspect, in a second possible implementation, a maximum allowable delay time allocated by the processor to a node, that is configured to remotely transmit IO data, of the nodes is greater than a maximum allowable delay time allocated by the processor to a node, that is configured to locally transmit IO data, of the nodes, and the maximum allowable delay time allocated by the processor to the node, that is configured to locally transmit IO data, of the nodes is greater than a maximum allowable delay time allocated by the processor to a node, that is configured to cache IO data, of the nodes.

With reference to the seventh aspect, in a third possible implementation, the transmitter is further configured to send, under control of the processor, a third request to a first VMF device on the first site side, where the third request is used to request the first VMF device to configure an IOCF device on the first site side such that the IOCF device sends intercepted IO data to a first RGF device on the first site side according to a maximum allowable delay time allocated by the processor to the IOCF device.

With reference to the third possible implementation of the seventh aspect, in a fourth possible implementation, the processor is further configured to instruct, after the receiver receives a timeout request sent by the IOCF device, the IOCF device to discard the IO data that needs to be transmitted currently, or reallocate a maximum allowable delay time to the IOCF after the receiver receives a timeout request sent by the IOCF device, and send the reallocated maximum allowable delay time to the IOCF device.

With reference to the seventh aspect, in a fifth possible implementation, the transmitter is further configured to send, under control of the processor, a fourth request to a first RGF device on the first site side, where the fourth request is used to request the first RGF device to receive IO data of the first VM intercepted by an IOCF device and send the received IO data to the second RGF device on the second site side according to a maximum allowable delay time allocated by the processor to the first RGF device.

With reference to the fifth possible implementation of the seventh aspect, in a sixth possible implementation, the fourth request carries connection information of the second RGF device on the second site side, or the processor is further configured to control the transmitter to send connection information of the second RGF device to the first RGF device after the receiver receives a fifth request sent by the first RGF device.

With reference to the fifth possible implementation of the seventh aspect, in a seventh possible implementation, the processor is further configured to instruct, after the receiver receives a timeout request sent by the first RGF device, the first RGF device to discard the IO data that needs to be transmitted currently, or reallocate a maximum allowable delay time to the first RGF device after the receiver receives a timeout request sent by the first RGF device, and control the transmitter to send the reallocated maximum allowable delay time to the first RGF device.

With reference to the seventh aspect, in an eighth possible implementation, the processor is further configured to reallocate, after the receiver receives a timeout request sent by the second DMF device on the second site side, a maximum allowable delay time to the second RGF device on the second site side and/or the IOWF device on the second site side according to the timeout request, and control the transmitter to send the reallocated maximum allowable delay time to the second DMF device.

With reference to any one of the seventh aspect or the first to the eighth possible implementations of the seventh aspect, in a ninth possible implementation, after determining that a transmission rate on the link for transmitting the IO data of the first VM changes, the processor is further configured to reallocate a maximum allowable delay time to each node that the IO data of the first VM passes through in the redundancy process, and control the transmitter to notify each node.

According to an eighth aspect, a CBF device is provided. The device includes a receiver configured to receive a sixth request sent by a tenant, where the sixth request includes identification information of a first VM that is on a first site side and that requires redundancy, and an SLA required when redundancy is performed on the first VM, a processor configured to determine an RPO from the sixth request, and a transmitter configured to send a first request to the first site side under control of the processor, where the first request is used to request to perform redundancy on the first VM on the first site side, and the first request includes the identification information of the first VM and the RPO.

According to a ninth aspect, a DMF device is provided. The device includes a receiver configured to receive a second request sent by a first DMF device on a first site side, where the second request is used to request a second site side to perform redundancy on a first VM on the first site side, and a transmitter configured to send, under control of a processor, a seventh request to a second VMF device on the second site side, where the seventh request is used to request the second VMF device to configure an IOWF device on the second site side such that the IOWF device writes, according to a maximum allowable delay time allocated by the first DMF device to the IOWF device, IO data of the first VM into a second VM that is configured to perform redundancy on the first VM, and send, under control of the processor, an eighth request to a second RGF device on the second site side, where the eighth request is used to request the second RGF device to locally transmit the IO data of the first VM according to a maximum allowable delay time allocated by the first DMF device to the second RGF device.

With reference to the ninth aspect, in a first possible implementation, the processor is further configured to instruct, after the receiver receives a timeout request sent by the IOWF device, the IOWF device to discard the IO data that needs to be transmitted currently, or control the transmitter to send, after the receiver receives a timeout request sent by the IOWF device, the timeout request to the first DMF device to request the first DMF device to reallocate a maximum allowable delay time to the IOWF device, and send the reallocated maximum allowable delay time, returned by the first DMF device, to the IOWF device after the reallocated maximum allowable delay time is received.

With reference to the ninth aspect, in a second possible implementation, the processor is further configured to instruct, after the receiver receives a timeout request sent by the second RGF device, the second RGF device to discard the IO data that needs to be transmitted currently, or control the transmitter to send, after the receiver receives a timeout request sent by the second RGF device, the timeout request to the first DMF device to request the first DMF device to reallocate a maximum allowable delay time to the second RGF device, and control the transmitter to send the reallocated maximum allowable delay time, returned by the first DMF device, to the second RGF device after the receiver receives the reallocated maximum allowable delay time.

According to a tenth aspect, a communications system is provided. The system includes a CBF device configured to receive a sixth request sent by a tenant, where the sixth request includes identification information of a first VM that is on a first site side and that requires redundancy, and an SLA required when redundancy is performed on the first VM, determine an RPO from the sixth request, and send a first request to the first site side, where the first request is used to request to perform redundancy on the first VM on the first site side, and the first request includes the identification information of the first VM and the RPO, a first DMF device on the first site side configured to receive the first request sent by the CBF device, where the first DMF device allocates, according to the RPO, a maximum allowable delay time to each node that IO data of the first VM passes through in a redundancy process, and sends a second request to a second DMF device on a second site side. The second request is used to request the second site side to perform redundancy on the first VM, and the second request includes the identification information of the first VM, a maximum allowable delay time of a second RGF device on the second site side, and a maximum allowable delay time of an IOWF device on the second site side, and the second DMF device configured to receive the second request sent by the first DMF device, send a seventh request to a second VMF device on the second site side, where the seventh request is used to request the second VMF device to configure an IOWF device on the second site side such that the IOWF device writes, according to a maximum allowable delay time allocated by the first DMF device to the IOWF device, the IO data of the first VM into a second VM that is configured to perform redundancy on the first VM, and send an eighth request to the second RGF device on the second site side, where the eighth request is used to request the second RGF device to locally transmit the IO data of the first VM according to a maximum allowable delay time allocated by the first DMF device to the second RGF device.

According to the method, device, and system provided in the embodiments of the present disclosure, after receiving a first request sent by a CBF device, a first DMF device on a first site side allocates, according to an RPO carried in the first request, a maximum allowable delay time to each node that IO data of the first VM passes through in a redundancy process, and sends a second request to a second site side, to request the second site side to perform redundancy on the first VM. Because redundancy services can be provided based on RPO requirements of different tenants, the RPO requirements of the tenants can be satisfied in an entire redundancy process in order to support a tenant self-service in public cloud business.

DESCRIPTION OF EMBODIMENTS

The following further describes the embodiments of the present disclosure in detail with reference to this specification. It should be understood that the specific embodiments described herein are merely used to explain the present disclosure but are not intended to limit the present disclosure.

To describe the technical solutions in the present disclosure, terms such as "first" and "second" are used to distinguish between different sites and devices on different site sides, but do not limit a quantity of different sites, a quantity of devices of the sites, or operation priorities. A first site represents any site and is also referred to as a production site. A second site represents a redundancy site that needs to perform redundancy on some or all VMs of the first site.

Figure 1:
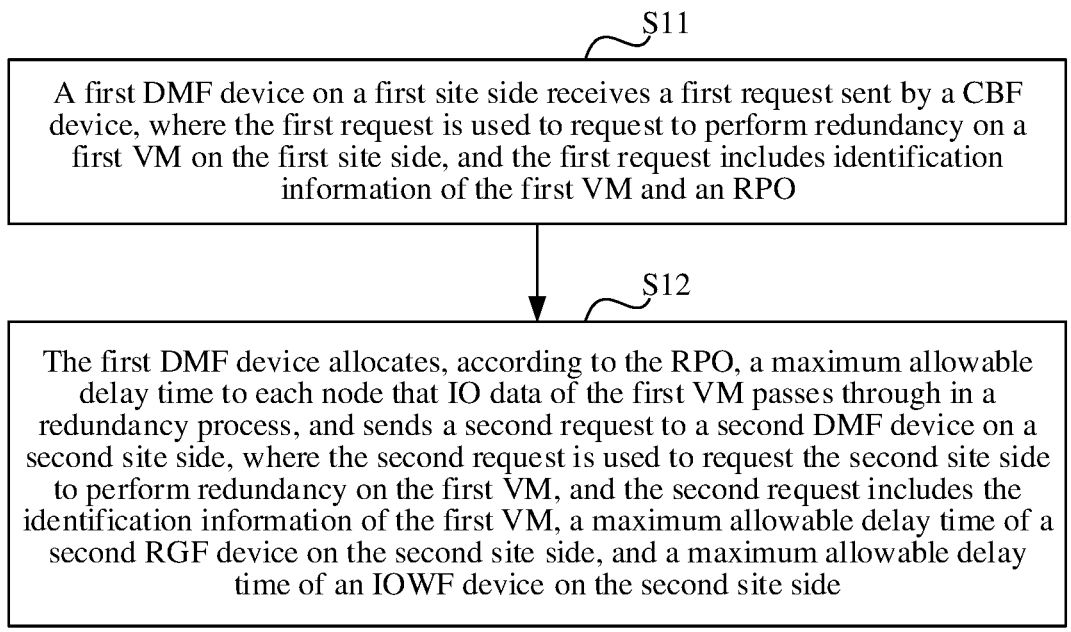
FIG. 1 is a schematic flowchart of a redundancy method executed by a first DMF device side on a first site side according to the present disclosure.

An embodiment of the present disclosure provides a redundancy method executed by a first DMF device side on a first site side. As shown in FIG. 1, the method includes the following steps.

Step S11: A first DMF device on the first site side receives a first request sent by a CBF device, where the first request is used to request to perform redundancy on a first VM on the first site side, and the first request includes identification information of the first VM and an RPO.

The RPO refers to an update degree to which a system and production data need to be recovered so that the system and an application data layer can be recovered to support a service operation of each department. The update degree may be backup data of the last week or real-time data of the last transaction. For example, the RPO is 30 seconds. This indicates that service data in the system can be recovered to a state that exists 30 seconds before the system crashes.

Step S12: The first DMF device allocates, according to the RPO, a maximum allowable delay time to each node that IO data of the first VM passes through in a redundancy process, and sends a second request to a second DMF device on a second site side, where the second request is used to request the second site side to perform redundancy on the first VM, and the second request includes the identification information of the first VM, a maximum allowable delay time of a second RGF device on the second site side, and a maximum allowable delay time of an IOWF device on the second site side.

In this embodiment of the present disclosure, after receiving a first request sent by a CBF device, a first DMF device on a first site side allocates, according to an RPO carried in the first request, a maximum allowable delay time to each node that IO data of the first VM passes through in a redundancy process, and sends a second request to a second site side to request the second site side to perform redundancy on the first VM. Because redundancy services can be provided based on RPO requirements of different tenants, the RPO requirements of the tenants can be satisfied in an entire redundancy process in order to support a tenant self-service in public cloud business. Based on RPOs of different tenants, a maximum allowable delay time is allocated to each node that IO data of the first VM passes through in a redundancy process, improving precision of redundancy control. In addition, for the tenants, each tenant can specify, using the CBF device, an RPO required by the tenant in order to satisfy the RPOs required by the different tenants in the redundancy process.

During implementation, the second request in step S12 further includes specification information of the first VM, for example, a type and a memory size of a central processing unit (CPU) such that the second site side can create, according to the specification information of the first VM, a corresponding second VM that is configured to perform redundancy on the IO data of the first VM.

During implementation, allocating, by the first DMF device, a maximum allowable delay time to each node according to the RPO in step S12 includes determining, by the first DMF device, a maximum allowable transmission delay per unit bandwidth on a link for transmitting the IO data of the first VM, determining, by the first DMF device, a difference between the RPO and the maximum allowable transmission delay per unit bandwidth on the link for transmitting the IO data of the first VM, setting, by the first DMF device, partial duration of the difference as a reserved delay, and allocating the maximum allowable delay time to each node based on remaining duration of the difference, where a sum of the MADT of the nodes is the remaining duration of the difference.

For example, a volume and a change rate of the data on the first VM on which redundancy is to be performed are estimated, to determine the maximum allowable transmission delay per unit bandwidth on the link for transmitting the IO data of the first VM. For example, it is assumed that a disk size of the first VM is 100 gigabytes (GB), and 50 GB of the disk has been used. Assuming that a change rate of existing data on the first VM is 10% per day, and a volume of increased data is less than 5% of the existing data per day, it is estimated according to a smart user model that a total of 50 GB*(10%+5%)=7.5 GB data is generated per day. If calculation is performed according to that the data is uniformly generated within 8 hours, data that needs to be transmitted per second is 7.5 GB/(3600*8)=0.26 megabytes (MB), and 2.6 milliseconds (ms) ((7.5 GB/(3600*8))/0.1 GB) is required for transmission on a 100 MB transmission link. That is, a maximum allowable transmission delay per unit bandwidth is 2.6 ms.

Preferably, a maximum allowable delay time allocated by the first DMF device to a node, that is configured to remotely transmit IO data, of the nodes is greater than a maximum allowable delay time allocated by the first DMF device to a node, that is configured to locally transmit IO data, of the nodes.

The maximum allowable delay time allocated by the first DMF device to the node, that is configured to locally transmit IO data, of the nodes is greater than a maximum allowable delay time allocated by the first DMF device to a node, that is configured to cache IO data, of the nodes.

For example, nodes on the link for transmitting the IO data of the first VM are an IOCF device on the first site side, a first RGF device, a second RGF device, and the IOWF device on the second site side in sequence. MADT of the nodes on the link are denoted as: iocf-MADT (representing an MADT allowed on the IOCF on the first site side), local-rgf-MADT (representing an MADT allowed on the first RGF), peer-rgf-MADT (representing an MADT allowed on the second RGF), and iowf-MADT (representing an MADT allowed on the IOWF on the second site side). During allocation, a transmission delay between the first RGF device and the second RGF device, that is, the reserved delay, further needs to be reserved. The MADT allocated by the first DMF device to the nodes may be as follows: iocf-MADT is 5% of the RPO, local-rgf-MADT is 40% of the RPO, peer-rgf-MADT is 10% of the RPO, and iowf-MADT is 5% of the RPO, and the reserved delay is 40% of the RPO, to deal with a delay that may be caused by a data burst.

During implementation, the method provided in this embodiment of the present disclosure further includes sending, by the first DMF device, a third request to a first VMF device on the first site side, where the third request is used to request the first VMF device to configure an IOCF device on the first site side such that the IOCF device sends intercepted IO data to a first RGF device on the first site side according to a maximum allowable delay time allocated by the first DMF device to the IOCF device.

Further, the third request carries the identification information of the first VM and the maximum allowable delay time allocated by the first DMF device to the IOCF device.

The present disclosure does not limit a time sequence between sending the third request by the first DMF device to the first VMF device and sending the second request by the first DMF device to the second site side.

Preferably, the method provided in this embodiment of the present disclosure further includes instructing, by the first DMF device after receiving a timeout request sent by the IOCF device, the IOCF device to discard the IO data that needs to be transmitted currently, or reallocating, by the first DMF device, a maximum allowable delay time to the IOCF after receiving a timeout request sent by the IOCF device, and sending the reallocated maximum allowable delay time to the IOCF device.

Further, after receiving the request sent by the first VMF device, the IOCF device intercepts the IO data of the first VM, and transmits the intercepted IO data to the first RGF according to the maximum allowable delay time allocated by the first DMF device to the IOCF device. If the IOCF device determines that a time for locally caching the IO data that needs to be transmitted currently has exceeded the maximum allowable delay time allocated by the first DMF device to the IOCF device, the IOCF device sends the timeout request to the first DMF device.

During implementation, the method provided in this embodiment of the present disclosure further includes sending, by the first DMF device, a fourth request to a first RGF device on the first site side, where the fourth request is used to request the first RGF device to receive IO data of the first VM intercepted by an IOCF device and send the received IO data to the second RGF device according to a maximum allowable delay time allocated by the first DMF device to the first RGF device.

Preferably, the fourth request carries connection information of the second RGF device on the second site side.

Alternatively, the method further includes sending, by the first DMF device, connection information of the second RGF device to the first RGF device after receiving a fifth request sent by the first RGF device.

Further, if the connection information of the second RGF is not configured in the first RGF device, in one implementation, the first DMF device adds the connection information to the fourth request when sending the fourth request, and in another implementation, the first DMF device sends the connection information of the second RGF device to the first RGF device after receiving a fifth request sent by the first RGF device.

Preferably, the connection information includes an Internet Protocol (IP) address of the second RGF and/or port information of the second RGF device.

Preferably, the method provided in this embodiment of the present disclosure further includes instructing, by the first DMF device after receiving a timeout request sent by the first RGF device, the first RGF device to discard the IO data that needs to be transmitted currently, or reallocating, by the first DMF device, a maximum allowable delay time to the first RGF device after receiving a timeout request sent by the first RGF device, and sending the reallocated maximum allowable delay time to the first RGF device.

Further, after receiving the IO data sent by the IOCF device, the first RGF device first caches the IO data, and sends the cached IO data to the second RGF device according to the maximum allowable delay time allocated by the first DMF device to the first RGF device. If the first RGF device determines that a time for locally caching the IO data that needs to be transmitted currently has exceeded the maximum allowable delay time allocated by the first DMF device to the first RGF device, the first RGF device sends the timeout request to the first DMF device.

Preferably, the method provided in this embodiment of the present disclosure further includes reallocating, by the first DMF device after receiving a timeout request sent by the second DMF device on the second site side, a maximum allowable delay time to the second RGF device on the second site side and/or the IOWF device on the second site side according to the timeout request, and sending the reallocated maximum allowable delay time to the second DMF device.

Further, after determining that a time for locally caching the IO data that needs to be transmitted currently has exceeded the maximum allowable delay time allocated by the first DMF device to the second RGF device, the second RGF device sends the timeout request to the second DMF device, and/or after determining that a time for locally caching the IO data that needs to be transmitted currently has exceeded the maximum allowable delay time allocated by the first DMF device to the IOWF device, the IOWF device sends the timeout request to the second DMF device. After receiving the timeout request sent by the second RGF device and/or the IOWF device, the second DMF device may directly instruct the second RGF device and/or the IOWF device to discard the IO data that needs to be transmitted currently, or may feedback the timeout request to the first DMF device such that the first DMF device determines whether to discard the IO data that needs to be transmitted currently or to reallocate the maximum allowable delay time to the second RGF device and/or the IOWF device.

Based on any one of the foregoing embodiments, the method provided in this embodiment of the present disclosure further includes reallocating, by the first DMF device, a maximum allowable delay time to each node that the IO data of the first VM passes through in the redundancy process, and notifying the nodes after a transmission rate on the link for transmitting the IO data of the first VM changes.

For example, when an intra-system transmission link degrades (that is, a transmission rate decreases), if a time required for transmitting the IO data that has been cached in the first RGF device significantly exceeds the maximum allowable delay time allocated by the first DMF device to the first RGF device, the MADT corresponding to the first RGF device needs to be dynamically adjusted, to relieve stress on the transmission link after data accumulation. For example, after it is detected that a rate on the link decreases by 50%, the MADT corresponding to the first RGF device is also decreased by 50%.

A redundancy process for a first VM in this embodiment of the present disclosure is as follows. In a normal running process of the first VM, a normal disk reading/writing request of the first VM in the running process is intercepted on an IOCF device of a host, and the IOCF device sends the request to a first RGF device. The first RGF device locally caches and compresses IO data of the first VM, and sends the IO data to a second RGF device on a second site side when a local-rgf-MADT requirement is satisfied. Similarly, the second RGF device sends the IO data of the first VM to a local IOWF device when a peer-rgf-MADT requirement is satisfied. After receiving the IO data of the first VM, the IOWF device writes the IO data to a memory corresponding to a second VM.

Figure 2:
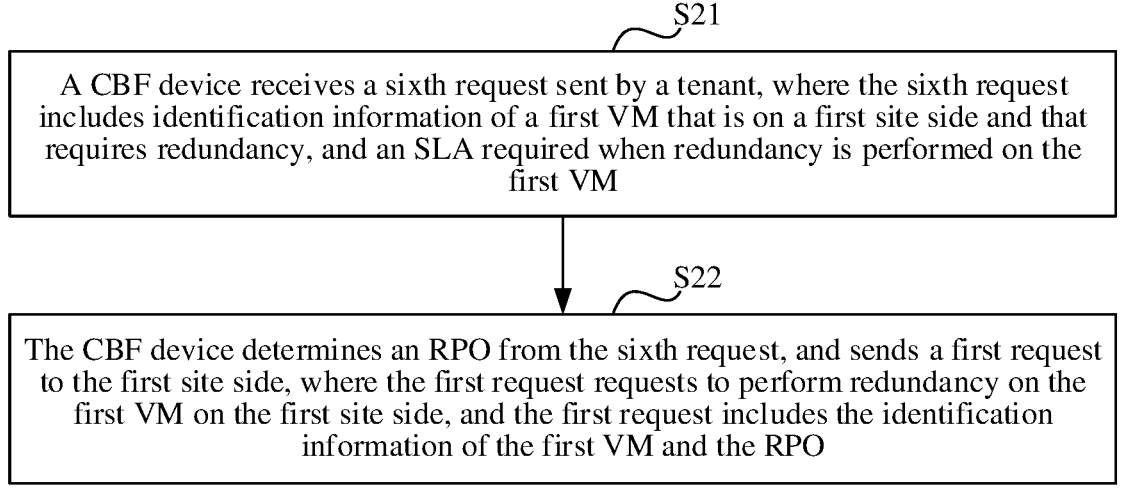
FIG. 2 is a schematic flowchart of a redundancy method executed by a CBF device side according to the present disclosure.

Based on the same disclosure idea, an embodiment of the present disclosure further provides a redundancy method executed by a CBF device side. As shown in FIG. 2, the method includes the following steps.

Step S21: A CBF device receives a sixth request sent by a tenant, where the sixth request includes identification information of a first VM that is on a first site side and that requires redundancy, and an SLA required when redundancy is performed on the first VM.

Step S22: The CBF device determines an RPO from the sixth request, and sends a first request to the first site side, where the first request requests to perform redundancy on the first VM on the first site side, and the first request includes the identification information of the first VM and the RPO.

In this embodiment of the present disclosure, a CBF device receives a sixth request sent by a tenant, where the sixth request includes identification information of a first VM that is on a first site side and that requires redundancy, and an SLA required when redundancy is performed on the first VM, and sends an RPO in the SLA to the first site side such that the first site side can perform redundancy based on RPOs of different tenants, thereby satisfying RPO requirements of the different tenants. In addition, for the tenants, each tenant can specify, using the CBF device, an RPO required by the tenant in order to satisfy the RPOs required by the different tenants in a redundancy process.

In this embodiment of the present disclosure, the CBF device provides an association relationship between a tenant and a resource rented by the tenant. Using a tenant and a VM used by the tenant as an example, an implementation of the association relationship is (tenant identifier, {VM list}). The CBF device serves as an ingress for the tenant to use a cloud redundancy service. The tenant can specify, using the CBF device, an SLA required when redundancy is performed on any VM used by the tenant. The SLA herein includes an RPO, and optionally, further includes a recovery time objective (RTO). The CBF device may interact with a first DMF device on a first site side to which a first VM that requires redundancy belongs, request the first DMF device to perform redundancy on the specified VM, and require the first DMF device to satisfy an RPO requirement. The first DMF may accept the request for performing redundancy on the first VM, and configure and implement a redundancy process according to the RPO requirement.

Figure 3:
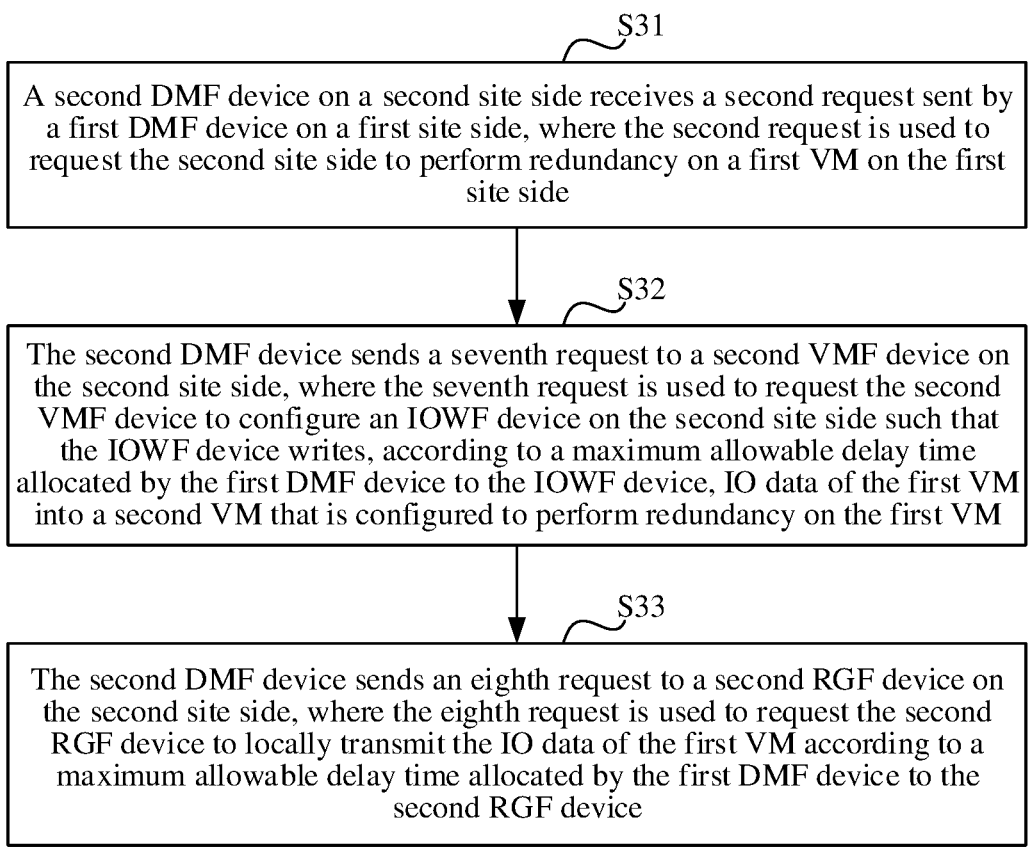
FIG. 3 is a schematic flowchart of a redundancy method executed by a second DMF device side on a second site side according to the present disclosure.

Based on the same disclosure idea, an embodiment of the present disclosure further provides a redundancy method executed by a second DMF device side on a second site side. As shown in FIG. 3, the method includes the following steps.

Step S31: A second DMF device on the second site side receives a second request sent by a first DMF device on a first site side, where the second request is used to request the second site side to perform redundancy on a first VM on the first site side.

Step S32: The second DMF device sends a seventh request to a second VMF device on the second site side, where the seventh request is used to request the second VMF device to configure an IOWF device on the second site side such that the IOWF device writes, according to a maximum allowable delay time allocated by the first DMF device to the IOWF device, IO data of the first VM into a second VM that is configured to perform redundancy on the first VM.

Step S33: The second DMF device sends an eighth request to a second RGF device on the second site side, where the eighth request is used to request the second RGF device to locally transmit the IO data of the first VM according to a maximum allowable delay time allocated by the first DMF device to the second RGF device.

Further, after receiving the seventh request, the second VMF device creates a placeholder VM (that is, the second VM). The placeholder VM is not started, and is only used as a redundancy VM. The IO data of the first VM is written into the redundancy VM for storage. After the second VM is created, the IOWF device is requested to write, when receiving the IO data sent by the second RGF, the IO data into the second VM for storage. The request carries at least identification information of the first VM, identification information of the second VM, and the maximum allowable delay time allocated by the first DMF device to the IOWF device.

Preferably, the eighth request carries the identification information of the first VM, the identification information of the second VM, and the maximum allowable delay time allocated by the first DMF device to the second RGF device.

During implementation, the method provided in this embodiment of the present disclosure includes instructing, by the second DMF device after receiving a timeout request sent by the IOWF device, the IOWF device to discard the IO data that needs to be transmitted currently, or sending, by the second DMF device after receiving a timeout request sent by the IOWF device, the timeout request to the first DMF device to request the first DMF device to reallocate a maximum allowable delay time to the IOWF device, and sending the reallocated maximum allowable delay time, returned by the first DMF device, to the IOWF device after receiving the reallocated maximum allowable delay time.

During implementation, the method provided in this embodiment of the present disclosure includes instructing, by the second DMF device after receiving a timeout request sent by the second RGF device, the second RGF device to discard the IO data that needs to be transmitted currently, or sending, by the second DMF device after receiving a timeout request sent by the second RGF device, the timeout request to the first DMF device to request the first DMF device to reallocate a maximum allowable delay time to the second RGF device, and sending the reallocated maximum allowable delay time, returned by the first DMF device, to the second RGF device after receiving the reallocated maximum allowable delay time.

The redundancy method provided in the embodiments of the present disclosure is described in detail below with reference to a specific embodiment and using an interaction process between devices on a first site side and devices on a second site side.

Embodiment 1

Figure 4:
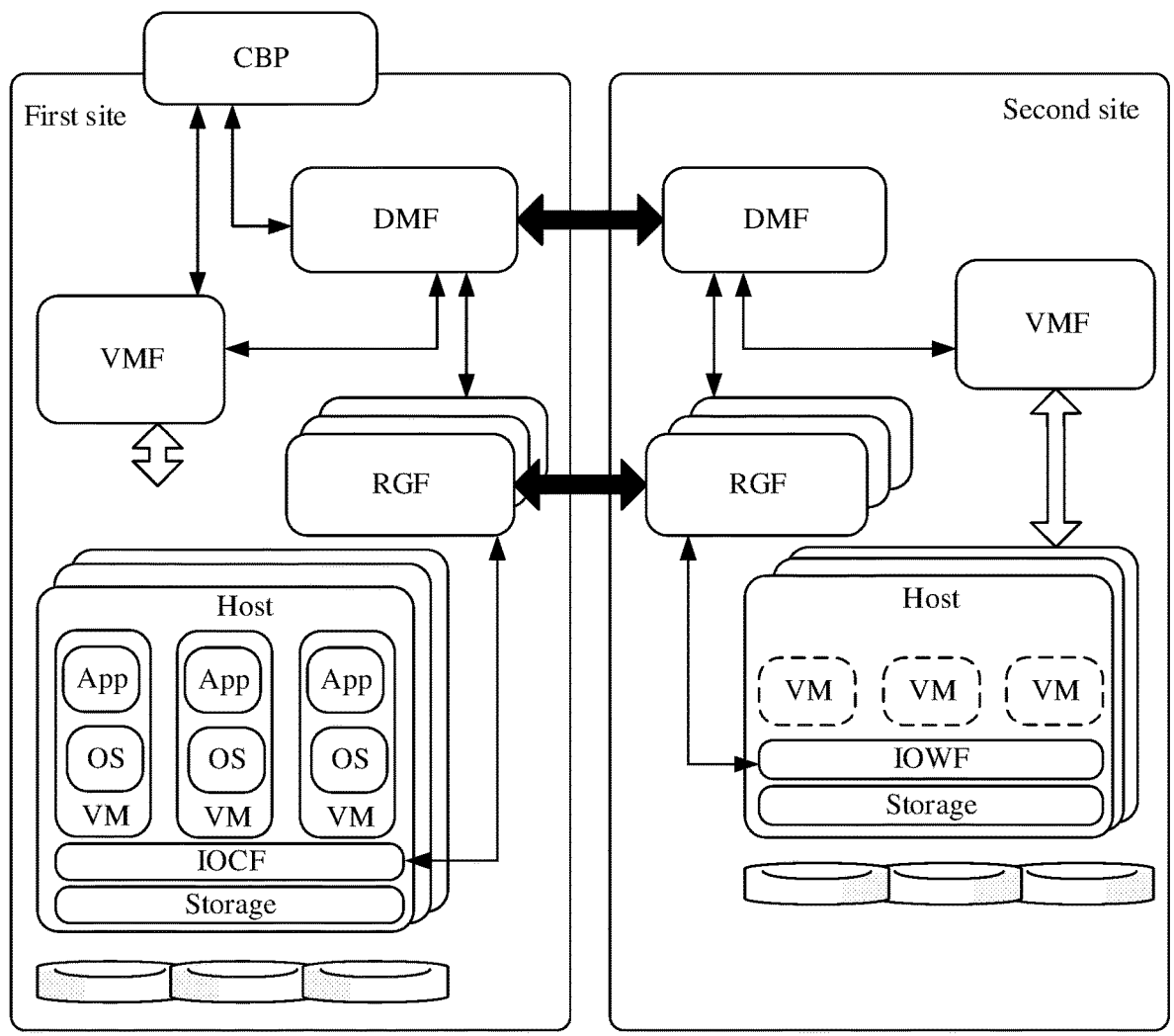
FIG. 4 is a schematic diagram of a network architecture of Embodiment 1 according to the present disclosure.
Figure 5:
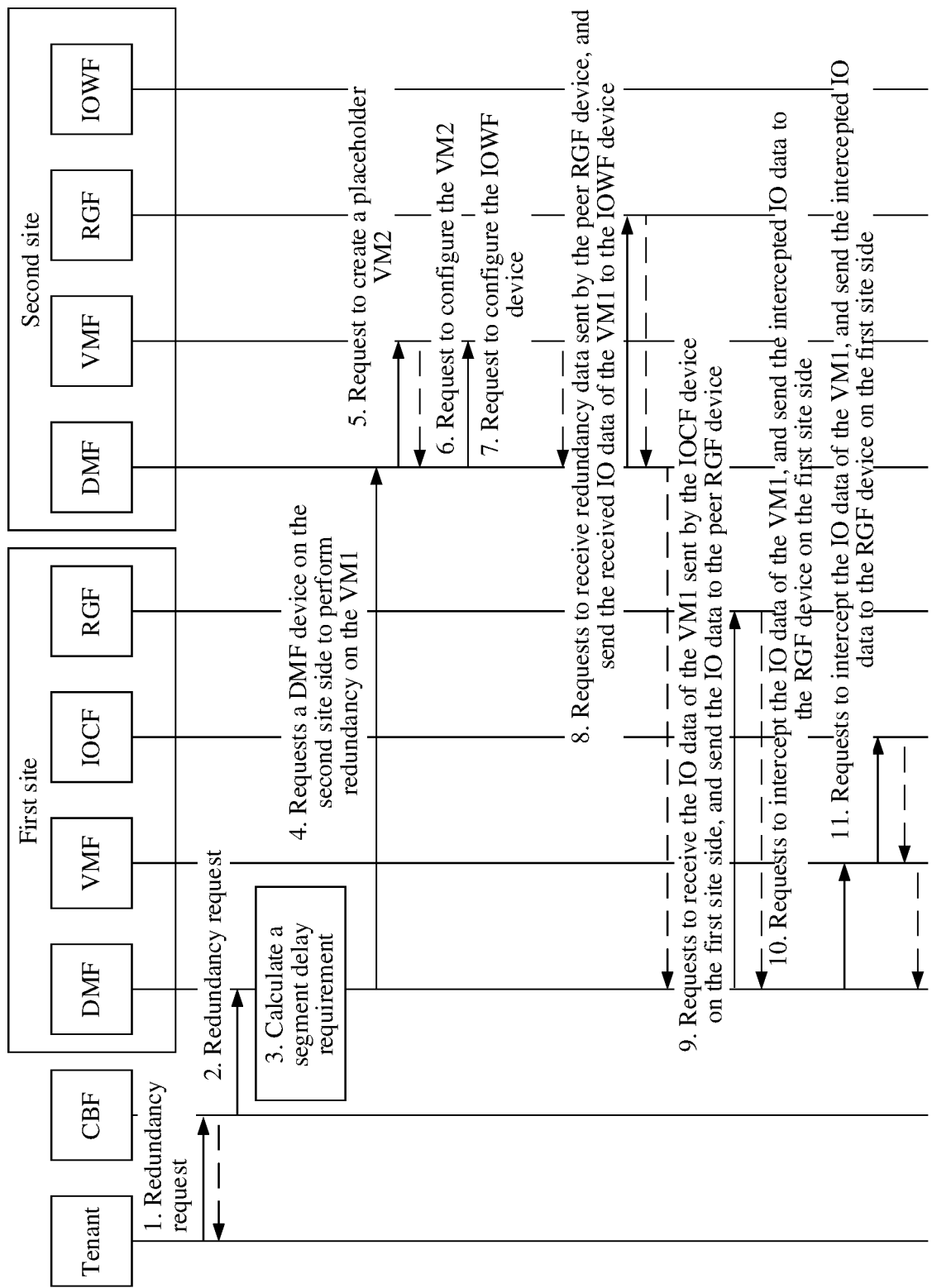
FIG. 5 is a schematic flowchart of Embodiment 1 according to the present disclosure.

A network architecture of this embodiment is shown in FIG. 4. A CBF device may be disposed on a first site side or may be disposed independently from a first site and a second site. A redundancy process in this embodiment is shown in FIG. 5, and includes the following steps.

Step 1: A tenant creates a redundancy request using the CBF device, and specifies a VM1 on which redundancy is to be performed (there may be multiple VMs, and herein only one VM is used for description) and a required SLA requirement in the request.

The SLA requirement includes key indicators such as an RPO and an RTO.

Step 2: The CBF device obtains an RPO indicator (for example, 30 seconds) in the SLA requirement, and requests a DMF device (a first DMF device) on the first site side to perform VM redundancy configuration, and interaction information between the CBF device and the DMF device includes at least (a VM1 identifier and an RPO).

Step 3: The DMF device on the first site side calculates a segment delay requirement, and specifies a segment delay time, to ensure that a total delay time is less than the RPO. Further, to satisfy the RPO requirement, the DMF device on the first site side splits the RPO requirement into MADT requirements for related network elements. The RPO requirement may be split into: iocf-MADT (representing an MADT allowed on an IOCF device on the first site side), local-rgf-MADT (representing an MADT allowed on an RGF device on the first site side), peer-rgf-MADT (representing an MADT allowed on an RGF device on a second site side), and iowf-MADT (representing an MADT allowed on an IOWF device on the second site side).

Step 4: The DMF device on the first site side requests a DMF device on the second site side to perform redundancy on the VM1. The request carries a VM1 identifier, VM1 specifications, peer-rgf-MADT, and peer-iowf-MADT.

Step 5: The DMF device on the second site side (that is, the foregoing peer DMF) requests a VMF device on the second site side to create a placeholder VM2 according to the received VM specifications, where the placeholder VM2 is not started and is only used as a redundancy VM, and IO data (that is, redundancy data) of the VM1 is written into a memory of the VM2.

Step 6: The DMF device on the second site side requests the VMF device on the second site side to configure the VM2 such that the VM2 receives the IO data of the VM1 on the first site side.

Step 7: The DMF device on the second site side requests the VMF on the second site side to configure the IOWF device such that when receiving data sent by the local RGF device to the IOWF device, the IOWF device writes the data into the memory of the VM2. The request carries at least the VM1 identifier, VM2 identifier, and iowf-MADT. When receiving data of the VM1, the IOWF device can write the data into the memory of the VM2 according to the foregoing parameters, and preferably ensure that a write delay is less than iowf-MADT.

Step 8: The DMF device on the second site side requests the RGF device on the second site side to receive redundancy data sent by the peer RGF device, and send the received IO data of the VM1 to the IOWF device. The request includes at least (the VM1 identifier, VM2 identifier, and peer-rgf-MADT). When receiving the IO data of the VM1, the DMF sends the IO data to the IOWF device, and a delay on the DMF device is less than peer-rgf-MADT.

Step 9: The DMF device on the first site side configures a first site after configuring a redundancy site. The DMF device on the first site side requests the RGF device on the first site side to receive the IO data of the VM1 sent by the IOCF device on the first site side, and send the IO data to the peer RGF device. The request carries at least the VM1 identifier and local-rgf-MADT.

Optionally, if connection information of the peer RGF device is not configured in the RGF device on the first site side, the DMF device on the first site side may dynamically deliver the request to the RGF on the first site side, and specify the connection information of the peer RGF device to the RGF device on the first site side. The connection information may include an IP address, a port, and the like.

Step 10: The DMF device on the first site side requests a VMF device on the first site side to intercept the IO data of the VM1, and send the intercepted IO data to the RGF device on the first site side. The request carries at least the VM1 identifier.

Step 11: The VMF device on the first site side requests the IOCF device on the first site side running the VM1 to intercept the IO data of the VM1, and send the intercepted IO data to the RGF device on the first site side. The request carries at least the VM1 identifier and iocf-MADT.

The entire VM1 redundancy configuration process is completed by performing the foregoing procedure.

The processing procedure of the foregoing method may be implemented using a software program, the software program may be stored in a storage medium, and when the stored software program is invoked, the steps of the foregoing method are performed.

Based on the same disclosure idea, an embodiment of the present disclosure further provides a DMF device. Because a principle of resolving a problem by the DMF device is similar to that in the redundancy method shown in FIG. 1, for implementation of the DMF device, refer to the implementation of the method. A repeated part is not described.

Figure 6:
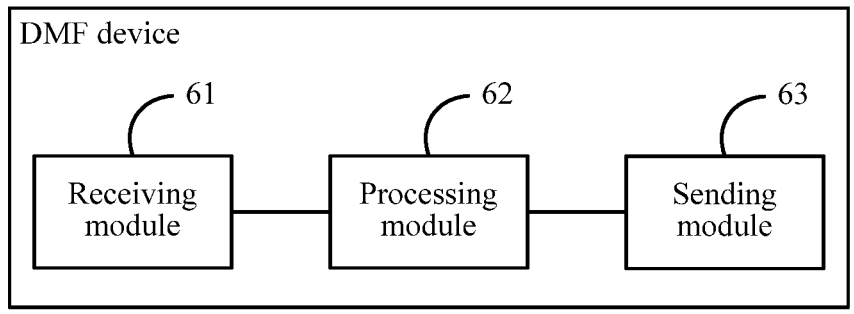
FIG. 6 is a schematic diagram of a first type of DMF device according to an embodiment of the present disclosure.

An embodiment of the present disclosure provides a DMF device. As shown in FIG. 6, the DMF device includes a receiving module 61 configured to receive a first request sent by a CBF device, where the first request is used to request to perform redundancy on a first VM on a first site side, and the first request includes identification information of the first VM and an RPO, a processing module 62 configured to allocate, according to the RPO, a maximum allowable delay time to each node that IO data of the first VM passes through in a redundancy process, and a sending module 63 configured to send a second request to a second DMF device on a second site side, where the second request is used to request the second site side to perform redundancy on the first VM, and the second request includes the identification information of the first VM, a maximum allowable delay time of a second RGF device on the second site side, and a maximum allowable delay time of an IOWF device on the second site side.

Optionally, the processing module 62 is further configured to determine a maximum allowable transmission delay per unit bandwidth on a link for transmitting the IO data of the first VM, determine a difference between the RPO and the maximum allowable transmission delay per unit bandwidth on the link for transmitting the IO data of the first VM, set partial duration of the difference as a reserved delay, and allocate the maximum allowable delay time to each node based on remaining duration of the difference, where a sum of the MADT of the nodes is the remaining duration of the difference.

Optionally, a maximum allowable delay time allocated by the processing module 62 to a node, that is configured to remotely transmit IO data, of the nodes is greater than a maximum allowable delay time allocated by the processing module 62 to a node, that is configured to locally transmit IO data, of the nodes.

The maximum allowable delay time allocated by the processing module 62 to the node, that is configured to locally transmit IO data, of the nodes is greater than a maximum allowable delay time allocated by the processing module 62 to a node, that is configured to cache IO data, of the nodes.

Optionally, the sending module 63 is further configured to send, under control of the processing module 62, a third request to a first VMF device on the first site side, where the third request is used to request the first VMF device to configure an IOCF device on the first site side such that the IOCF device sends intercepted IO data to a first RGF device on the first site side according to a maximum allowable delay time allocated by the processing module 62 to the IOCF device.

Optionally, the processing module 62 is further configured to instruct, after the receiving module 61 receives a timeout request sent by the IOCF device, the IOCF device to discard the IO data that needs to be transmitted currently, or reallocate a maximum allowable delay time to the IOCF after the receiving module 61 receives a timeout request sent by the IOCF device, and send the reallocated maximum allowable delay time to the IOCF device.

Optionally, the sending module 63 is further configured to send, under control of the processing module 62, a fourth request to a first RGF device on the first site side, where the fourth request is used to request the first RGF device to receive IO data of the first VM intercepted by an IOCF device and send the received IO data to the second RGF device on the second site side according to a maximum allowable delay time allocated by the processing module 62 to the first RGF device.

Optionally, the fourth request carries connection information of the second RGF device on the second site side.

Alternatively, the processing module 62 is further configured to control the sending module 63 to send connection information of the second RGF device to the first RGF device after the receiving module 61 receives a fifth request sent by the first RGF device.

Optionally, the processing module 62 is further configured to instruct, after the receiving module 61 receives a timeout request sent by the first RGF device, the first RGF device to discard the IO data that needs to be transmitted currently, or reallocate a maximum allowable delay time to the first RGF device after the receiving module 61 receives a timeout request sent by the first RGF device, and control the sending module 63 to send the reallocated maximum allowable delay time to the first RGF device.

Optionally, the processing module 62 is further configured to reallocate, after the receiving module 61 receives a timeout request sent by the second DMF device on the second site side, a maximum allowable delay time to the second RGF device on the second site side and/or the IOWF device on the second site side according to the timeout request, and control the sending module 63 to send the reallocated maximum allowable delay time to the second DMF device.

Based on any one of the foregoing embodiments, after determining that a transmission rate on the link for transmitting the IO data of the first VM changes, the processing module 62 is further configured to reallocate a maximum allowable delay time to each node that the IO data of the first VM passes through in the redundancy process, and control the sending module 63 to notify each node.

Based on the same disclosure idea, an embodiment of the present disclosure further provides a CBF device. Because a principle of resolving a problem by the CBF device is similar to that in the redundancy method shown in FIG. 2, for implementation of the CBF device, refer to the implementation of the method. A repeated part is not described.

Figure 7:
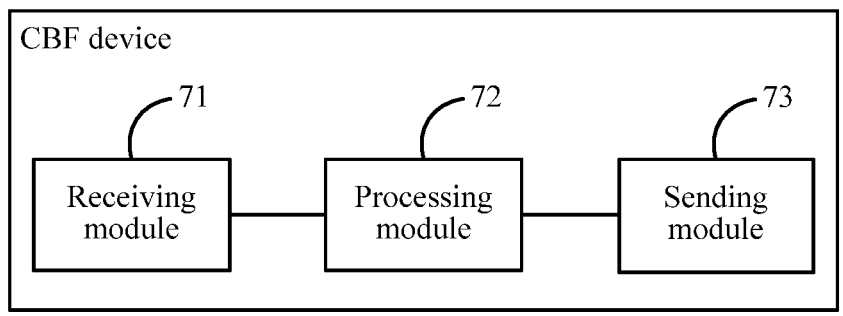
FIG. 7 is a schematic diagram of a first type of CBF device according to an embodiment of the present disclosure.

An embodiment of the present disclosure provides a CBF device. As shown in FIG. 7, the device includes a receiving module 71 configured to receive a sixth request sent by a tenant, where the sixth request includes identification information of a first VM that is on a first site side and that requires redundancy, and an SLA required when redundancy is performed on the first VM, a processing module 72 configured to determine an RPO from the sixth request, and a sending module 73 configured to send a first request to the first site side under control of the processing module 72, where the first request is used to request to perform redundancy on the first VM on the first site side, and the first request includes the identification information of the first VM and the RPO.

Based on the same disclosure idea, an embodiment of the present disclosure further provides a DMF device. Because a principle of resolving a problem by the DMF device is similar to that in the redundancy method shown in FIG. 3, for implementation of the DMF device, refer to the implementation of the method. A repeated part is not described.

Figure 8:
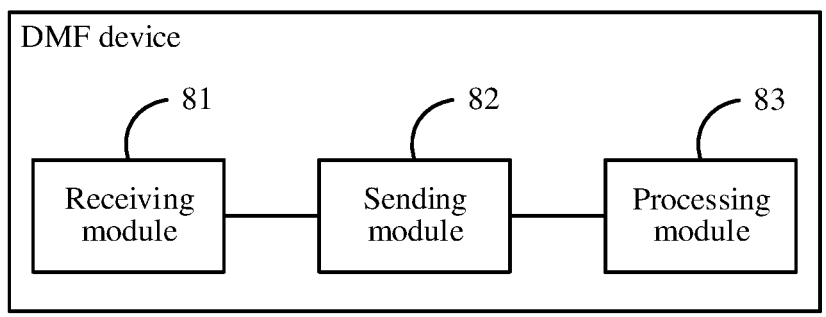
FIG. 8 is a schematic diagram of a second type of DMF device according to an embodiment of the present disclosure.

An embodiment of the present disclosure provides a DMF device. As shown in FIG. 8, the DMF device includes a receiving module 81 configured to receive a second request sent by a first DMF device on a first site side, where the second request is used to request a second site side to perform redundancy on a first VM on the first site side, and a sending module 82 configured to send, under control of a processing module 83, a seventh request to a second VMF device on the second site side, where the seventh request is used to request the second VMF device to configure an IOWF device on the second site side such that the IOWF device writes, according to a maximum allowable delay time allocated by the first DMF device to the IOWF device, IO data of the first VM into a second VM that is configured to perform redundancy on the first VM, and send, under control of the processing module 83, an eighth request to a second RGF device on the second site side, where the eighth request is used to request the second RGF device to locally transmit the IO data of the first VM according to a maximum allowable delay time allocated by the first DMF device to the second RGF device.

Optionally, the processing module 83 is further configured to instruct, after the receiving module 81 receives a timeout request sent by the IOWF device, the IOWF device to discard the IO data that needs to be transmitted currently, or control the sending module 82 to send, after the receiving module 81 receives a timeout request sent by the IOWF device, the timeout request to the first DMF device to request the first DMF device to reallocate a maximum allowable delay time to the IOWF device, and send the reallocated maximum allowable delay time, returned by the first DMF device, to the IOWF device after the reallocated maximum allowable delay time is received.

Optionally, the processing module 83 is further configured to instruct, after the receiving module 81 receives a timeout request sent by the second RGF device, the second RGF device to discard the IO data that needs to be transmitted currently, or control the sending module 82 to send, after the receiving module 81 receives a timeout request sent by the second RGF device, the timeout request to the first DMF device to request the first DMF device to reallocate a maximum allowable delay time to the second RGF device, and control the sending module 82 to send the reallocated maximum allowable delay time, returned by the first DMF device, to the second RGF device after the receiving module 81 receives the reallocated maximum allowable delay time.

It should be noted that the function modules of the DMF device shown in FIG. 6 and the function modules of the DMF device shown in FIG. 8 may be further disposed in a same DMF device. If the DMF device is located on the first site side, the receiving module 61, the processing module 62, and the sending module 63 work, if the DMF device is located on the second site side, the receiving module 81, the processing module 83, and the sending module 82 work.

Figure 9:
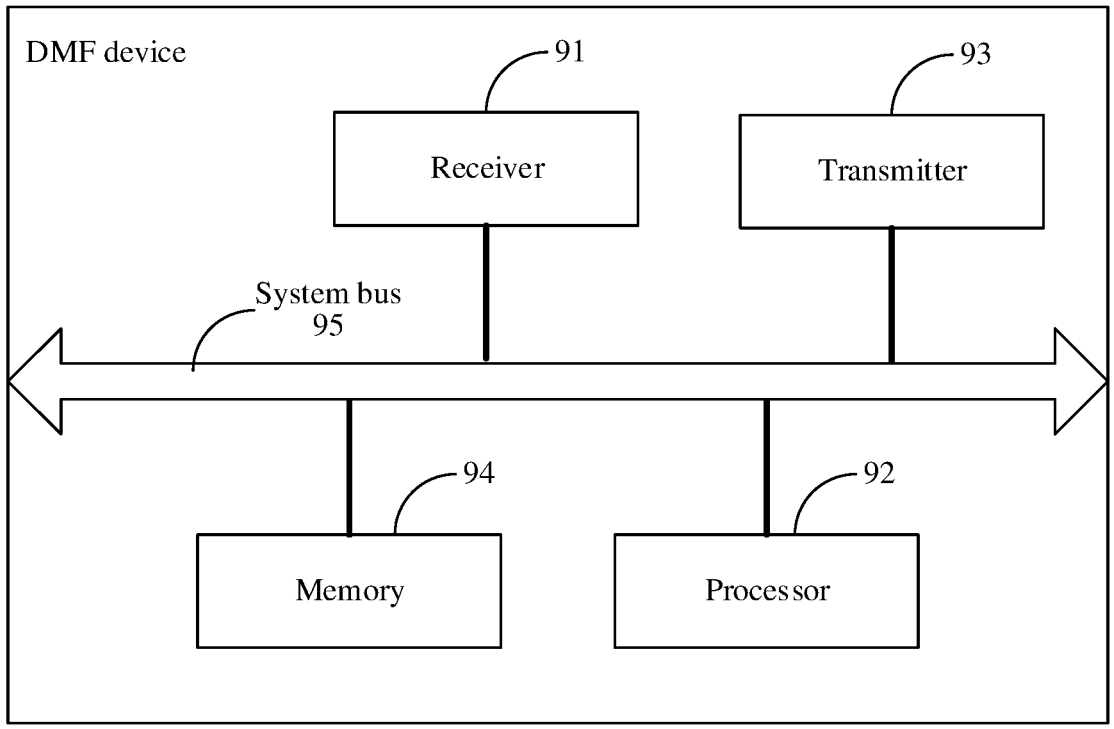
FIG. 9 is a schematic diagram of a third type of DMF device according to an embodiment of the present disclosure.

Based on the same disclosure idea, an embodiment of the present disclosure further provides a DMF device. As shown in FIG. 9, the DMF device includes a receiver 91 configured to receive a first request sent by a CBF device, where the first request is used to request to perform redundancy on a first VM on a first site side, and the first request includes identification information of the first VM and an RPO, a processor 92 configured to allocate, according to the RPO, a maximum allowable delay time to each node that IO data of the first VM passes through in a redundancy process, and a transmitter 93 configured to send, under control of the processor 92, a second request to a second DMF device on a second site side, where the second request is used to request the second site side to perform redundancy on the first VM, and the second request includes the identification information of the first VM, a maximum allowable delay time of a second RGF device on the second site side, and a maximum allowable delay time of an IOWF device on the second site side.

The DMF device provided in this embodiment of the present disclosure further includes a memory 94 and a system bus 95. The processor 92, the receiver 91, the transmitter 93, and the memory 94 are connected and communicate with each other using the system bus 95. The memory 94 may be configured to store an instruction and data. The memory 94 may mainly include an instruction storage area and a data storage area. The data storage area may store data used when the processor 92 performs an operation, and the instruction storage area may store an instruction required by an operating system or at least one function, or the like.

The processor 92 may be a CPU, an application-specific integrated circuit (ASIC), or one or more integrated circuits configured to implement this embodiment of the present disclosure.

Optionally, the processor 92 is further configured to determine a maximum allowable transmission delay per unit bandwidth on a link for transmitting the IO data of the first VM, determine a difference between the RPO and the maximum allowable transmission delay per unit bandwidth on the link for transmitting the IO data of the first VM, set partial duration of the difference as a reserved delay, and allocate the maximum allowable delay time to each node based on remaining duration of the difference, where a sum of the MADT of the nodes is the remaining duration of the difference.

Optionally, a maximum allowable delay time allocated by the processor 92 to a node, that is configured to remotely transmit IO data, of the nodes is greater than a maximum allowable delay time allocated by the processor 92 to a node, that is configured to locally transmit IO data, of the nodes.

The maximum allowable delay time allocated by the processor 92 to the node, that is configured to locally transmit 10 data, of the nodes is greater than a maximum allowable delay time allocated by the processor 92 to a node, that is configured to cache IO data, of the nodes.

Optionally, the transmitter 93 is further configured to send, under control of the processor 92, a third request to a first VMF device on the first site side, where the third request is used to request the first VMF device to configure an IOCF device on the first site side such that the IOCF device sends intercepted 10 data to a first RGF device on the first site side according to a maximum allowable delay time allocated by the processor 92 to the IOCF device.

Optionally, the processor 92 is further configured to instruct, after the receiver 91 receives a timeout request sent by the IOCF device, the IOCF device to discard the IO data that needs to be transmitted currently, or reallocate a maximum allowable delay time to the IOCF after the receiver 91 receives a timeout request sent by the IOCF device, and send the reallocated maximum allowable delay time to the IOCF device.

Optionally, the transmitter 93 is further configured to send, under control of the processor 92, a fourth request to a first RGF device on the first site side, where the fourth request is used to request the first RGF device to receive IO data of the first VM intercepted by an IOCF device and send the received IO data to the second RGF device on the second site side according to a maximum allowable delay time allocated by the processor 92 to the first RGF device.

Optionally, the fourth request carries connection information of the second RGF device on the second site side.

Alternatively, the processor 92 is further configured to control the transmitter 93 to send connection information of the second RGF device to the first RGF device after the receiver 91 receives a fifth request sent by the first RGF device.

Optionally, the processor 92 is further configured to instruct, after the receiver 91 receives a timeout request sent by the first RGF device, the first RGF device to discard the IO data that needs to be transmitted currently, or reallocate a maximum allowable delay time to the first RGF device after the receiver 91 receives a timeout request sent by the first RGF device, and control the transmitter 93 to send the reallocated maximum allowable delay time to the first RGF device.

Optionally, the processor 92 is further configured to reallocate, after the receiver 91 receives a timeout request sent by the second DMF device on the second site side, a maximum allowable delay time to the second RGF device on the second site side and/or the IOWF device on the second site side according to the timeout request, and control the transmitter 93 to send the reallocated maximum allowable delay time to the second DMF device.

Based on any one of the foregoing embodiments, after determining that a transmission rate on the link for transmitting the IO data of the first VM changes, the processor 92 is further configured to reallocate a maximum allowable delay time to each node that the IO data of the first VM passes through in the redundancy process, and control the transmitter 93 to notify each node.

Figure 10:
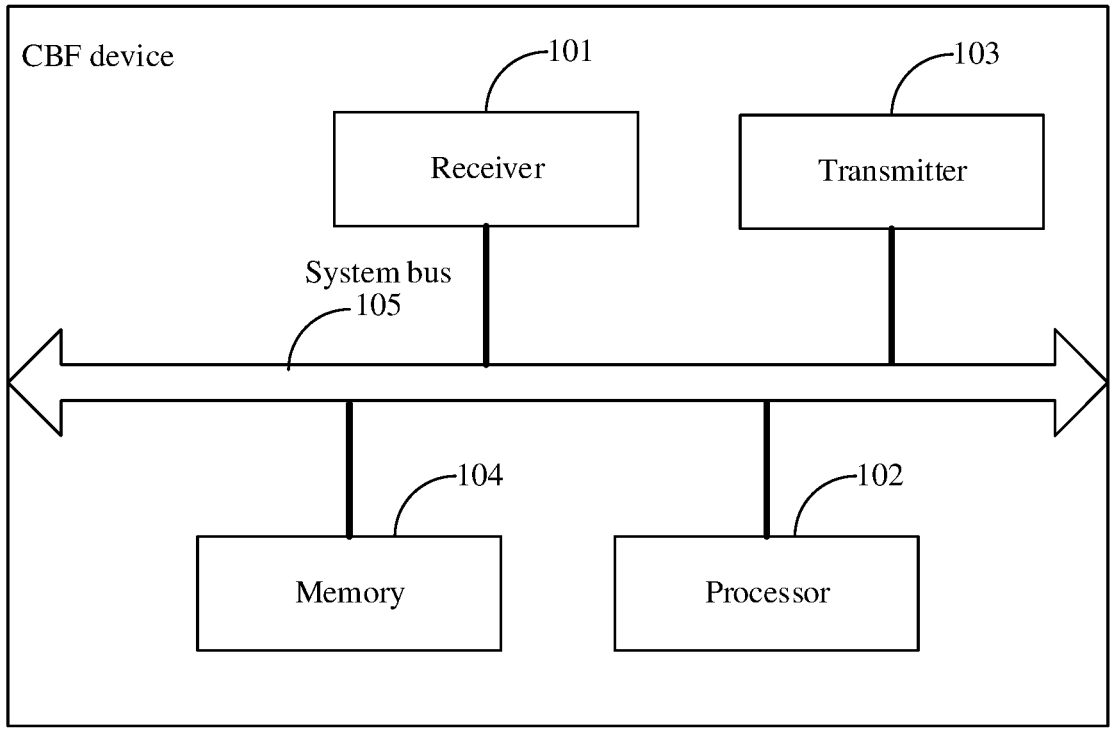
FIG. 10 is a schematic diagram of a second type of CBF device according to an embodiment of the present disclosure.

Based on the same disclosure idea, an embodiment of the present disclosure further provides a CBF device. As shown in FIG. 10, the CBF device includes a receiver 101 configured to receive a sixth request sent by a tenant, where the sixth request includes identification information of a first VM that is on a first site side and that requires redundancy, and an SLA required when redundancy is performed on the first VM, and a processor 102 configured to determine an RPO from the sixth request, and a transmitter 103 configured to send a first request to the first site side under control of the processor 102, where the first request is used to request to perform redundancy on the first VM on the first site side, and the first request includes the identification information of the first VM and the RPO.

The CBF device provided in this embodiment of the present disclosure further includes a memory 104 and a system bus 105. The processor 102, the receiver 101, the transmitter 103, and the memory 104 are connected and communicate with each other using the system bus 105. The memory 104 may be configured to store an instruction and data. The memory 104 may mainly include an instruction storage area and a data storage area. The data storage area may store data used when the processor 102 performs an operation, and the instruction storage area may store an instruction required by an operating system or at least one function, or the like.

The processor 102 may be a CPU, an ASIC, or one or more integrated circuits configured to implement this embodiment of the present disclosure.

Figure 11:
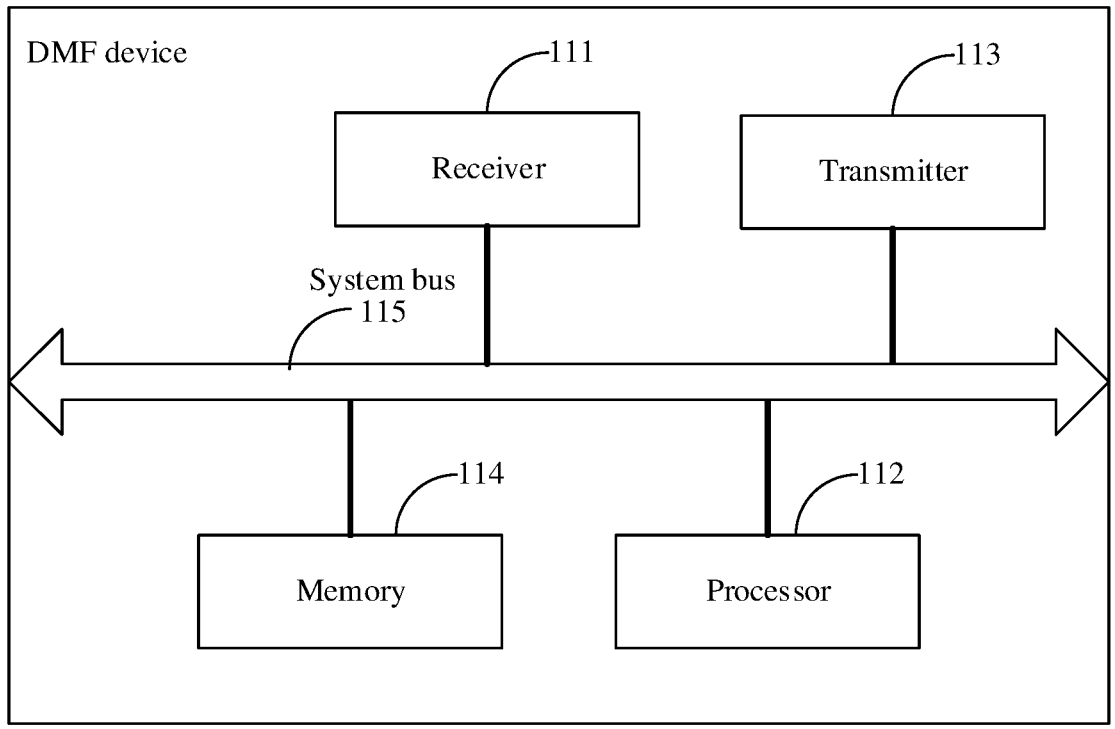
FIG. 11 is a schematic diagram of a fourth type of DMF device according to an embodiment of the present disclosure.

Based on the same disclosure idea, an embodiment of the present disclosure further provides a DMF device. As shown in FIG. 11, the DMF device includes a receiver 111 configured to receive a second request sent by a first DMF device on a first site side, where the second request is used to request a second site side to perform redundancy on a first VM on the first site side, and a transmitter 113 configured to send, under control of a processor 112, a seventh request to a second VMF device on the second site side, where the seventh request is used to request the second VMF device to configure an IOWF device on the second site side such that the IOWF device writes, according to a maximum allowable delay time allocated by the first DMF device to the IOWF device, IO data of the first VM into a second VM that is configured to perform redundancy on the first VM, and send, under control of the processor 112, an eighth request to a second RGF device on the second site side, where the eighth request is used to request the second RGF device to locally transmit the IO data of the first VM according to a maximum allowable delay time allocated by the first DMF device to the second RGF device.

The DMF device provided in this embodiment of the present disclosure further includes a memory 114 and a system bus 115. The processor 112, the receiver 111, the transmitter 113, and the memory 114 are connected and communicate with each other using the system bus 115. The memory 114 may be configured to store an instruction and data. The memory 114 may mainly include an instruction storage area and a data storage area. The data storage area may store data used when the processor 112 performs an operation, and the instruction storage area may store an instruction required by an operating system or at least one function, or the like.

The processor 112 may be a CPU, an ASIC, or one or more integrated circuits configured to implement this embodiment of the present disclosure.

Optionally, the processor 112 is further configured to instruct, after the receiver 111 receives a timeout request sent by the IOWF device, the IOWF device to discard the IO data that needs to be transmitted currently, or control the transmitter 113 to send, after the receiver 111 receives a timeout request sent by the IOWF device, the timeout request to the first DMF device to request the first DMF device to reallocate a maximum allowable delay time to the IOWF device, and send the reallocated maximum allowable delay time, returned by the first DMF device, to the IOWF device after the reallocated maximum allowable delay time is received.

Optionally, the processor 112 is further configured to instruct, after the receiver 111 receives a timeout request sent by the second RGF device, the second RGF device to discard the IO data that needs to be transmitted currently, or control the transmitter 113 to send, after the receiver 111 receives a timeout request sent by the second RGF device, the timeout request to the first DMF device to request the first DMF device to reallocate a maximum allowable delay time to the second RGF device, and control the transmitter 113 to send the reallocated maximum allowable delay time, returned by the first DMF device, to the second RGF device after the receiver 111 receives the reallocated maximum allowable delay time.

It should be noted that the function modules of the DMF device shown in FIG. 9 and the function modules of the DMF device shown in FIG. 11 may be further disposed in a same DMF device. If the DMF device is located on the first site side, the receiver 91, the processor 92, and the transmitter 93 work, if the DMF device is located on the second site side, the receiver 111, the processor 112, and the transmitter 113 work.

Figure 12:
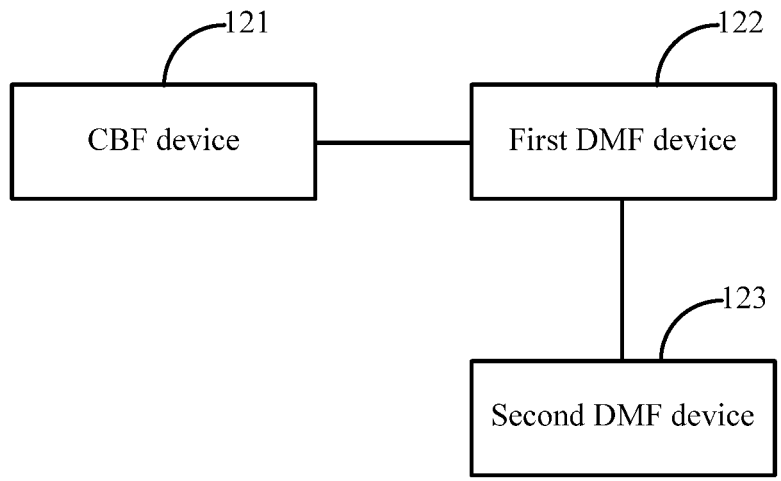
FIG. 12 is a schematic diagram of a communications system according to an embodiment of the present disclosure.

Based on the same disclosure idea, an embodiment of the present disclosure further provides a communications system. As shown in FIG. 12, the system includes a CBF device 121 configured to receive a sixth request sent by a tenant, where the sixth request includes identification information of a first VM that is on a first site side and that requires redundancy, and an SLA required when redundancy is performed on the first VM, determine an RPO from the sixth request, and send a first request to the first site side, where the first request is used to request to perform redundancy on the first VM on the first site side, and the first request includes the identification information of the first VM and the RPO. A first DMF device 122 on the first site side configured to receive the first request sent by the CBF device 121, where the first DMF device 122 allocates, according to the RPO, a maximum allowable delay time to each node that IO data of the first VM passes through in a redundancy process, and sends a second request to a second DMF device 123 on a second site side, the second request is used to request the second site side to perform redundancy on the first VM, and the second request includes the identification information of the first VM, a maximum allowable delay time of a second RGF device on the second site side, and a maximum allowable delay time of an IOWF device on the second site side, and the second DMF device 123 configured to receive the second request sent by the first DMF device 122, send a seventh request to a second VMF device on the second site side, where the seventh request is used to request the second VMF device to configure an IOWF device on the second site side such that the IOWF device writes, according to a maximum allowable delay time allocated by the first DMF device 122 to the IOWF device, the IO data of the first VM into a second VM that is configured to perform redundancy on the first VM, and send an eighth request to the second RGF device on the second site side, where the eighth request is used to request the second RGF device to locally transmit the IO data of the first VM according to a maximum allowable delay time allocated by the first DMF device 122 to the second RGF device.

It should be noted that the CBF device 121 in the communications system provided in this embodiment of the present disclosure may be the CBF device shown in FIG. 7, or may be the CBF device shown in FIG. 10.

The first DMF device 122 in the communications system provided in this embodiment of the present disclosure may be the DMF device shown in FIG. 6, or may be the DMF device shown in FIG. 9.

The second DMF device 123 in the communications system provided in this embodiment of the present disclosure may be the DMF device shown in FIG. 8, or may be the DMF device shown in FIG. 11.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact-disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A redundancy method implemented by a first disaster management function (DMF) device on a first site side, the redundancy method comprising:
receiving a first request from a cloud business function (CBF) device, wherein the first request requests to perform redundancy on a first virtual machine (VM) on the first site side, and wherein the first request comprises identification information of the first VM and a recovery point objective (RPO);
determining a maximum allowable transmission delay per unit bandwidth on a link for transmitting input/output (IO) data of the first VM;
determining a difference between the RPO and the maximum allowable transmission delay per unit bandwidth on the link for transmitting the IO data of the first VM;
setting a partial duration of the difference as a reserved delay;
allocating, according to the RPO and based on a remaining duration of the difference, a maximum allowable delay time to each node that the IO data of the first VM passes through in a redundancy process, wherein a sum of the maximum allowable delay time to each node comprises the remaining duration of the difference; and
sending a second request to a second DMF device on a second site side,
wherein the second request requests the second site side to perform the redundancy on the first VM, and
wherein the second request comprises the identification information of the first VM, a maximum allowable delay time of a second replication gateway function (RGF) device on the second site side, and a maximum allowable delay time of an IO writer function (IOWF) device on the second site side.

2. The redundancy method of claim 1, wherein a maximum allowable delay time allocated by the first DMF device to a node, that is configured to remotely transmit IO data, of the nodes is greater than a maximum allowable delay time allocated by the first DMF device to a node, that is configured to locally transmit IO data, of the nodes, and wherein the maximum allowable delay time allocated by the first DMF device to the node, that is configured to locally transmit the IO data, of the nodes is greater than a maximum allowable delay time allocated by the first DMF device to a node, that is configured to cache IO data, of the nodes.

3. The redundancy method of claim 1, further comprising sending a third request to a first virtualization management function (VMF) device on the first site side, wherein the third request requests the first VMF device to configure an IO catcher function (IOCF) device on the first site side.

4. The redundancy method of claim 3, further comprising:
receiving a timeout request from the IOCF device; and
instructing, after receiving the timeout request, the IOCF device to discard IO data that needs to be transmitted.

5. The redundancy method of claim 3, further comprising:
receiving a timeout request from the IOCF device;
reallocating, after receiving the timeout request, a maximum allowable delay time to the IOCF device as a reallocated maximum allowable delay time; and
sending the reallocated maximum allowable delay time to the IOCF device.

6. The redundancy method of claim 1, further comprising sending a third request to a first RGF device on the first site side, wherein the third request requests the first RGF device to receive the IO data of the first VM intercepted by an IO catcher function (IOCF) device and send the received IO data to the second RGF device according to a maximum allowable delay time allocated by the first DMF device to the first RGF device.

7. The redundancy method of claim 6, further comprising:
receiving a timeout request from the first RGF device;
reallocating, after receiving the timeout request, the maximum allowable delay time to the first RGF device as a reallocated maximum allowable delay time; and
sending the reallocated maximum allowable delay time to the first RGF device.

8. The redundancy method of claim 1, further comprising:
receiving a timeout request from the second DMF device;
reallocating, according to the timeout request the maximum allowable delay time to the second RGF device and the maximum allowable delay time to the IOWF device as a reallocated maximum allowable delay time; and
sending the reallocated maximum allowable delay time to the second DMF device.

9. The redundancy method of claim 1, further comprising:
receiving a timeout request from the second DMF device;
reallocating, according to the timeout request, the maximum allowable delay time to the second RGF device as a reallocated maximum allowable delay time; and
sending the reallocated maximum allowable delay time to the second DMF device.

10. The redundancy method of claim 1, further comprising:
receiving a timeout request from the second DMF device; and
reallocating, according to the timeout request, the maximum allowable delay time to the IOWF device as a reallocated maximum allowable delay time.

11. The redundancy method of claim 10, further comprising sending the reallocated maximum allowable delay time to the second DMF device.

12. The redundancy method of claim 1, further comprising reallocating the maximum allowable delay time to each node that the IO data of the first VM passes through in the redundancy process after a transmission rate on a link for transmitting the IO data of the first VM changes.

13. The redundancy method of claim 12, further comprising notifying each node of the reallocating.

14. A redundancy method implemented by a second disaster management function (DMF) device on a second site side, the redundancy method comprising:
receiving a first request from a first DMF device on a first site side, wherein the first request requests the second site side to perform redundancy on a first virtual machine (VM) on the first site side;
sending a second request to a second virtualization management function (VMF) device on the second site side, wherein the second request requests the second VMF device to configure an input/output (IO) writer function (IOWF) device on the second site side;
sending a third request to a second replication gateway function (RGF) device on the second site side, wherein the third request requests the second RGF device to locally transmit IO data of the first VM according to a maximum allowable delay time allocated by the first DMF device to the second RGF device;
receiving a timeout request from the IOWF device; and
instructing, after receiving the timeout request, the IOWF device to discard IO data that needs to be transmitted.

15. The redundancy method of claim 14, further comprising:
sending the timeout request to the first DMF device to request the first DMF device to reallocate the maximum allowable delay time as a reallocated maximum allowable delay time;
receiving the reallocated maximum allowable delay time from the first DMF device; and
sending the reallocated maximum allowable delay time to the second RGF device.

16. A first disaster management function (DMF) device comprising:
a memory comprising instructions; and
a processor coupled to the memory, wherein the instructions cause the processor to be configured to:
receive a first request from a cloud business function (CBF) device, wherein the first request requests to perform redundancy on a first virtual machine (VM) on a first site side, and wherein the first request comprises identification information of the first VM and a recovery point objective (RPO);
determine a maximum allowable transmission delay per unit bandwidth on a link for transmitting input/output (IO) data of the first VM;
determine a difference between the RPO and the maximum allowable transmission delay per unit bandwidth on the link for transmitting the IO data of the first VM;
set a partial duration of the difference as a reserved delay;
allocate, according to the RPO and based on a remaining duration of the difference, a maximum allowable delay time to each node that the IO data of the first VM passes through in a redundancy process, wherein a sum of the maximum allowable delay time to each node comprises the remaining duration of the difference; and
send a second request to a second DMF device on a second site side,
wherein the second request requests the second site side to perform the redundancy on the first VM, and
wherein the second request comprises the identification information of the first VM, a maximum allowable delay time of a second replication gateway function (RGF) device on the second site side, and a maximum allowable delay time of an IO writer function (IOWF) device on the second site side.

17. The first DMF device of claim 16, wherein the instructions further cause the processor to be configured to send a third request to a first virtualization management function (VMF) device on the first site side, and wherein the third request requests the first VMF device to configure an IO catcher function (IOCF) device on the first site side.

18. The first DMF device of claim 17, wherein the instructions further cause the processor to be configured to:
receive a timeout request from the IOCF device; and
reallocate, after receiving the timeout request, a maximum allowable delay time to the IOCF as a reallocated maximum allowable delay time.

19. The first DMF device of claim 18, wherein the instructions further cause the processor to be configured to send the reallocated maximum allowable delay time to the IOCF device.

20. A redundancy method implemented by a second disaster management function (DMF) device on a second site side, the redundancy method comprising:
receiving a first request from a first DMF device on a first site side, wherein the first request requests the second site side to perform redundancy on a first virtual machine (VM) on the first site side;
sending a second request to a second virtualization management function (VMF) device on the second site side, wherein the second request requests the second VMF device to configure an input/output (IO) writer function (IOWF) device on the second site side;
sending a third request to a second replication gateway function (RGF) device on the second site side, wherein the third request requests the second RGF device to locally transmit IO data of the first VM according to a maximum allowable delay time allocated by the first DMF device to the second RGF device;

receiving a timeout request from the IOWF device;

sending the timeout request to the first DMF device to request the first DMF device to reallocate a maximum allowable delay time to the IOWF device as a reallocated maximum allowable delay time;

receiving the reallocated maximum allowable delay time from the first DMF device; and sending the reallocated maximum allowable delay time to the IOWF device.

* * * * *